Aug. 12, 1930.  J. W. ARNEY  1,772,794
JUVENILE VEHICLE
Filed Nov. 14, 1928   2 Sheets-Sheet 1
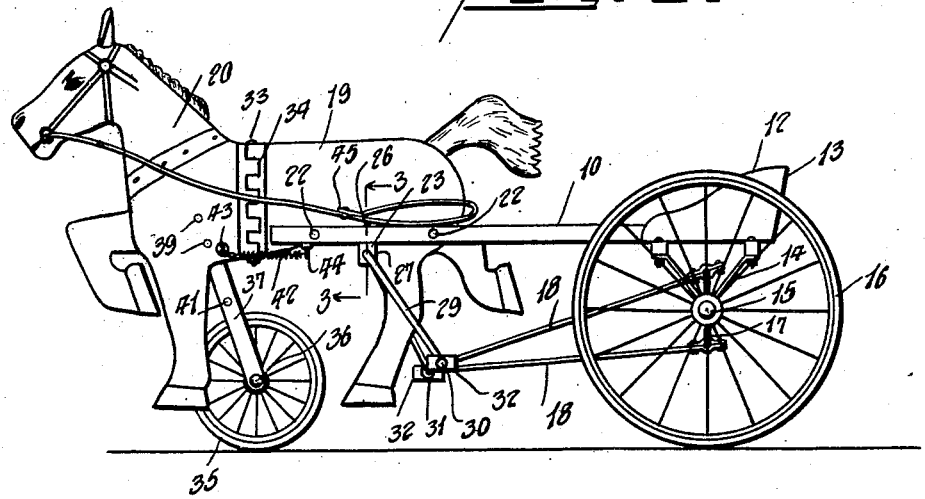
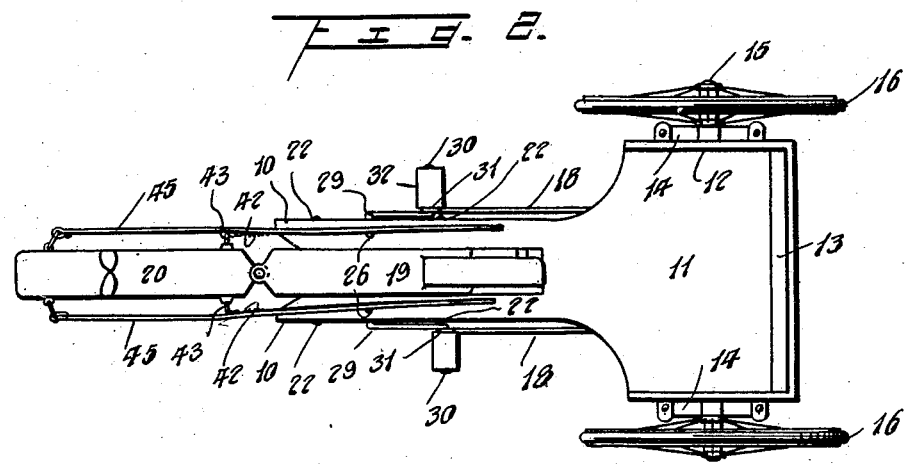
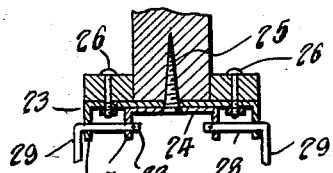
Inventor
J. W. Arney.

Aug. 12, 1930.    J. W. ARNEY    1,772,794
JUVENILE VEHICLE
Filed Nov. 14, 1928    2 Sheets-Sheet 2
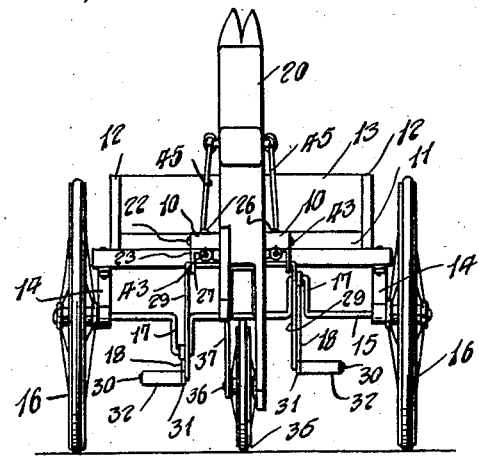
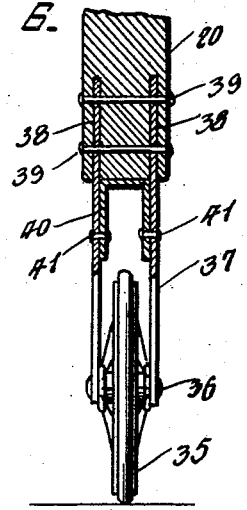
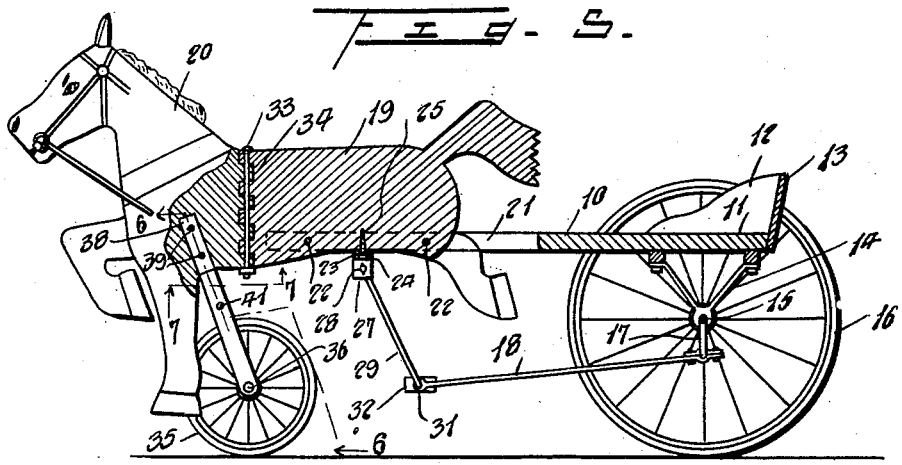
Inventor
J. W. Arney,
By
Attorney Patented Aug. 12, 1930

1,772,794

UNITED STATES PATENT OFFICE

JOHN W. ARNEY, OF GREEN BAY, WISCONSIN

JUVENILE VEHICLE

Application filed November 14, 1928. Serial No. 319,399.

This invention relates to a juvenile vehicle and generally aims to provide an exceedingly sturdy, compact, durable and inexpensive construction.

In particular it is among the prime objects to provide a rigid thill sulky, a close hitch and short turn vehicle or sulky, the construction having a special arrangement of the equalizing springs elevated to give greater leverage and to avoid rubbing when extended, to provide a perpendicular wheel and hinge alinement to prevent swaying, to provide a built in wheel fork and to provide a seat and thill arrangement adapting it to various leg lengths.

With the foregoing and additional objects and advantages in view, such as will appear from a consideration of the description following taken in connection with accompanying drawings, the invention has been embodied in one operative form as illustrated in said drawings and wherein:

Figure 1 is a side elevation;
Figure 2 is a plan view;
Figure 3 is a detail sectional view taken on the line 3—3 of Figure 1;
Figure 4 is a front elevation;
Figure 5 is a substantially central longitudinal sectional view;
Figure 6 is a sectional view taken on the line 6—6 of Figure 5; and
Figure 7 is a cross sectional view taken on the line 7—7 of Figure 5.

Referring specifically to the drawings wherein like reference characters designate like or similar parts, 10 designates a board or platform which is widened at the rear as at 11 so as to constitute a seat, preferably having sides 12 and a back 13 built up thereon. Bearings or brackets 14 are fastened to the under surface of the seat 11 and journal an axle 15 on which are rigidly mounted relatively large rear wheels 16. Said axle has oppositely extended cranks 17 to which pitman 18 is pivotally connected as shown.

At the front body members 19 and 20 are provided. The forward portion of platform 10 has a central longitudinal slot 21 in which the body member 19 is disposed and fastened as by transverse elements 22 passed through the platform and said member as best shown in Figures 3 and 5, brackets 23 and 24 are provided under the body member 19 both being secured thereto as by a screw 25 and the bracket 23 in addition being secured by bolts 26 to the bifurcated element of the platform 10. Such brackets 23 and 24 provide spaced pairs of hanger lugs 27 in which horizontal arms 28 of links 29 are journaled. Such links 29 at their lower ends have horizontal portions 30 passing loosely through eyelets 31 in the forward end of the pitman 18 and accommodating pedals 32 thereon.

The sections or members 19 and 20 are connected by a pintle 33 passing vertically through interfitting hinge portions 34. The body member 20 is mounted on a wheel 35 journaled on a short shaft 36 supported by forks 37 which extends at an angle forwardly and upwardly and into slots 38 in the body member 20, being secured rigidly therein by cross rivets or fastening members 39. Particularly to reenforce the structure at this point so that children mounting the sections 19 and 20 will not weaken the same, a U-shaped bracket 40 is arranged as shown in Figure 6, having its closed portion abutting the member 20 and its legs fitted against the inner surfaces of the spokes 37 and riveted thereto as at 41.

Contractile springs 42 are disposed at opposite sides of the hinged joint between the sections 19 and 20 being connected as at 43 and 44 to the sections 20 and 19, respectively. Flexible reins 45 extend rearwardly from the body section 20.

It will be realized that in use, the child occupys the seat 11 and operates the pedals 32 so as to impart motion to the rear shaft and wheels 16 thereon, section 20 moving from right to left and being pointed ahead by the springs 42, the section 21 being guided through manipulation of the reins 45.

It will be realized that the construction described accomplishes all of the objects and advantages enumerated herein.

Various changes may be resorted to provided they fall within the spirit and scope of the invention.

I claim as my invention:—

1. A child's vehicle of the class described comprising a platform having a slot adjacent its front, a body member fastened in said slot, a body member pivoted to the first mentioned body member on a vertical axis, contractile springs secured to the second mentioned body member on opposite sides of said axis and secured to said platform, a wheel for the second mentioned body member having its axis in perpendicular alinement with the said axis, means mounting said wheel extending from the second mentioned body member, bracket means secured to the under surface of the platform and first mentioned body member, links pivoted to said bracket means, a pitman having eyelets through which said links extend, pedals on said links beyond the eyelets, a rear axle on said platform, wheels fixed to said axle, and cranks on said axle engaged by said pitman.

2. A child's vehicle of the class described comprising a platform having a slot adjacent its front, a body member fastened in said slot, a body member pivoted to the first mentioned body member on a vertical axis, contractile springs secured to the second mentioned body member on opposite sides of said axis and secured to said platform, a wheel for the second mentioned body member having its axis in perpendicular alinement with the said vertical axis, means mounting said wheel extending from the second mentioned body member, a rear axle on said platform, wheels fixed to said rear axle and means operable to drive said rear axle.

3. A child's vehicle of the class described comprising a platform having a slot adjacent its front, a body member fastened in said slot, a body member pivoted to the first mentioned body member on a vertical axis, contractile springs secured to the second mentioned body member on opposite sides of said axis and secured to said platform, a wheel for the second mentioned body member having its axis in perpendicular alinement with the said vertical axis, and means mounting said wheel extending from the second mentioned body member, and wheel means for the platform rearwardly of the first mentioned body member.

In testimony whereof I affix my signature.

JOHN W. ARNEY.